United States Patent [19]

Hines et al.

[11] 4,037,614
[45] July 26, 1977

[54] VEHICLE CANOPY

[75] Inventors: Charles E. Hines; Dwight E. Williams, both of Lincoln, Nebr.

[73] Assignee: Outboard Marine Corporation, Waukegan, Ill.

[21] Appl. No.: 658,593

[22] Filed: Feb. 17, 1976

[51] Int. Cl.² ............... B62D 25/06; A47C 29/00
[52] U.S. Cl. .................... 135/5 A; 5/113;
  5/362; 135/5.1; 135/7.1 A; 296/102; 297/184;
  D12/16
[58] Field of Search ............ 296/102; 135/5 A, 5 R,
  135/7.1 A, 5.1; 5/113, 362; 297/184; D12/16,
  23, 156

[56] References Cited
U.S. PATENT DOCUMENTS

| 2,888,021 | 5/1959 | Adams | 135/7.1 R |
| 3,176,699 | 4/1965 | Rollins | 135/5 R |
| 3,252,469 | 5/1966 | Peake | 135/7.1 R |
| 3,255,467 | 6/1966 | Kowalski | 135/5 R X |
| D. 184,547 | 3/1959 | Walker | D12/156 |
| D. 236,098 | 7/1975 | Bedel | D12/16 |

OTHER PUBLICATIONS
Golf Digest, May 1967, p. 88.
Golf Digest, May 1962, p. 59.

Primary Examiner—Thomas F. Callaghan
Assistant Examiner—Conrad L. Berman
Attorney, Agent, or Firm—Michael, Best & Friedrich

[57] ABSTRACT

Disclosed herein is a canopy for vehicles, such as golf cars, which canopy is adapted for mounting on a plurality of upstanding support posts carried by a vehicle. The canopy includes brackets for mounting thereof on the vehicle support posts, a resilient, perimeter frame supported by the support brackets and having opposed arcuate end sections, which in their free form, lie in a generally horizontally, outwardly bowed relation to each other, and a flexible, water-repellent top mounted on the perimeter frame in a manner so as to distort the end sections upwardly from their free form and cause the end sections, in attempting to return to their free form, to apply multi-directional stresses on the top such that the top assumes a generally upwardly convex shape in cross section.

9 Claims, 6 Drawing Figures

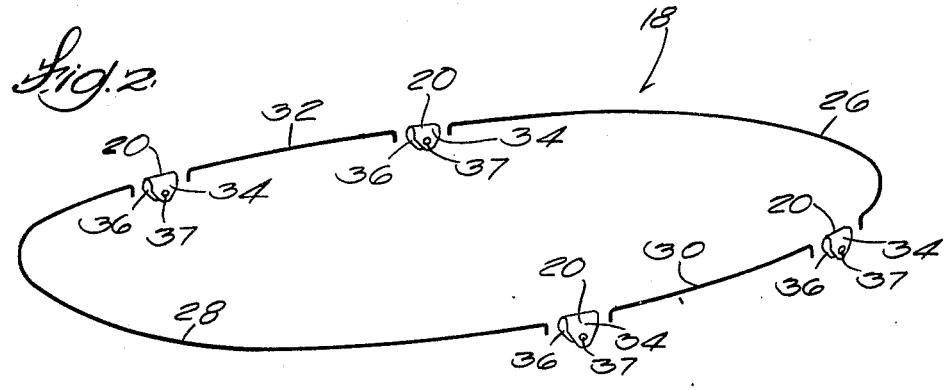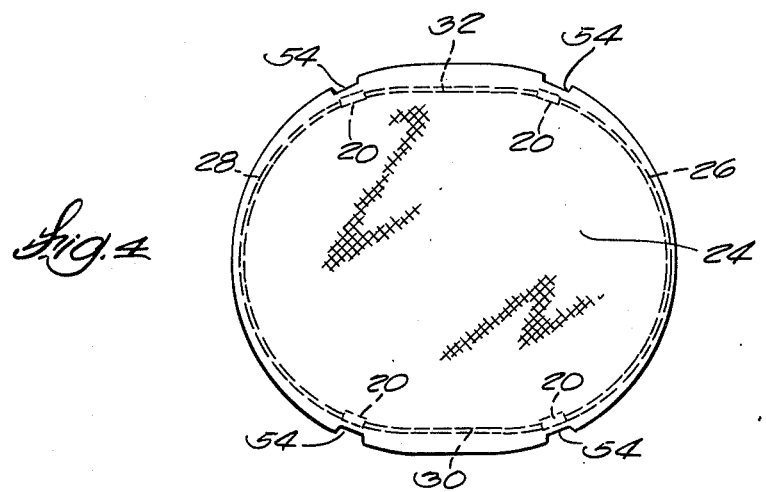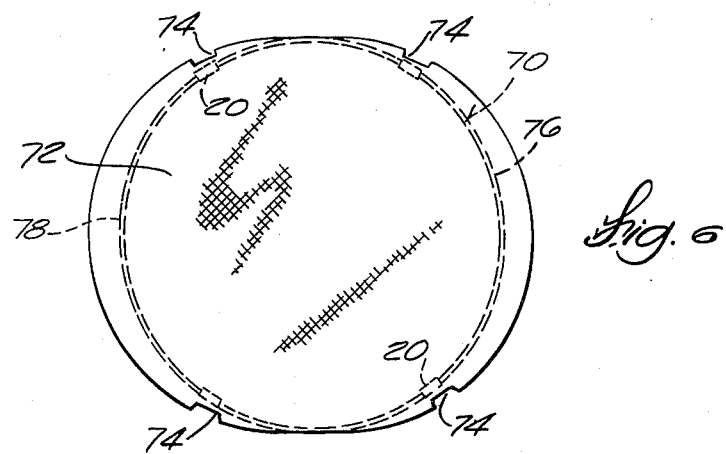

VEHICLE CANOPY

BACKGROUND OF THE INVENTION

The invention relates to canopies for vehicles, such as golf cars and the like, and more particularly to such canopies having a flexible top.

Overhead canopies are used on golf cars and other similar vehicles to protect the riders from the sun and rain. Such canopies are of two general types, "hardtop" canopies constructed from a relatively rigid material, such as fiberglass, and "soft top" canopies constructed from a flexible, water-repellent material, such as a vinyl coated fabric.

The flexible nature of the material used for soft top canopies causes it to sag in the middle and collect rain water unless properly supported. To overcome this problem, some type of framework which provides a tent-like or crowned shape typically is used to support the flexible top so that the rain water will drain off. This framework usually includes perimeter frame members which are supported on posts mounted on the golf car frame and one or more cross members which support the central portion of the flexible material in an elevated position. This framework can be quite heavy and the inertia thereof causes the generation of considerable stresses when the vehicle is driven over rough terrain. Consequently, additional reinforcing members oftentimes are required for the framework and the support posts and vehicle mounts therefor must be constructed from high strength, relatively expensive materials. Also, the means used for attaching the top to the support frame frequently requires the top to be made from several pieces.

SUMMARY OF THE INVENTION

In accordance with the invention, the weight and complexity of the support structure for a soft top canopy is minimized by providing a resilient perimeter frame which is arranged to cause the flexible top to assume a generally upwardly convex shape in cross section.

The canopy for golf cars or other vehicles provided by the invention includes bracket means for mounting the canopy on a plurality of upstanding support posts carried by the vehicle, a resilient perimeter frame supported by the bracket means and having opposed, arcuate end sections, which, in their free state, extend generally horizontally in outwardly bowed relation to each other and a flexible, water-repellent top mounted on the perimeter frame in a manner so as to distort or deflect the arcuate end sections upwardly from their free form and cause the end sections, in attempting to return to their free form, to apply multi-directional stresses on the flexible top such that it assumes a generally upwardly convex shape in cross section. With the top being held in this shape, pockets in which rain water can collect are eliminated without the use of additional support or stay members, thereby minimizing the overall weight of the canopy and permitting the use of lower strength, less expensive support posts and vehicle mounts therefor.

In a preferred embodiment, the perimeter frame is formed from segments of a tough, resilient wire, such as music wire, with the ends thereof terminating in a small right angle bend and the support brackets include a recessed portion for receiving and clampingly holding the end portions of the wire segments so they will not twist or pull away from the brackets.

One of the principal features of the invention is the provision of an inexpensive soft top canopy for golf cars or other vehicles.

Another of the principal features of the invention is the provision of a soft top canopy for golf cars or other vehicles having a simple, lightweight support structure for the flexible top so as to minimize the strength requirements of the upstanding support posts carried by the vehicle and the vehicle mounts therefor.

Still another of the principal features of the invention is the provision of a soft top canopy for golf cars or other vehicles having a perimeter support frame as the sole means for holding the flexible top in a shape which promotes immediate shedding of rain water.

Other features and advantages of embodiments of the invention will become apparent upon reviewing the following detailed description, the drawing and the appended claims.

BRIEF DESCRIPTION OF THE DRAWING

FIG. 2 is an exploded perspective view of the support frame for the canopy of FIG. 1 prior to assembly of the support brackets with the perimeter frame members and prior to the installation of the flexible top.

FIG. 4 is a top plan view of the assembled support frame and an exemplary pattern of the top for the canopy of FIG. 1, shown with the top in a position ready for attachment to the support frame.

FIG. 6 is a top plan view of an alternate construction of the support frame and an exemplary pattern of the top, shown with the top in a position ready for attachment to the support frame.

Figure 1:
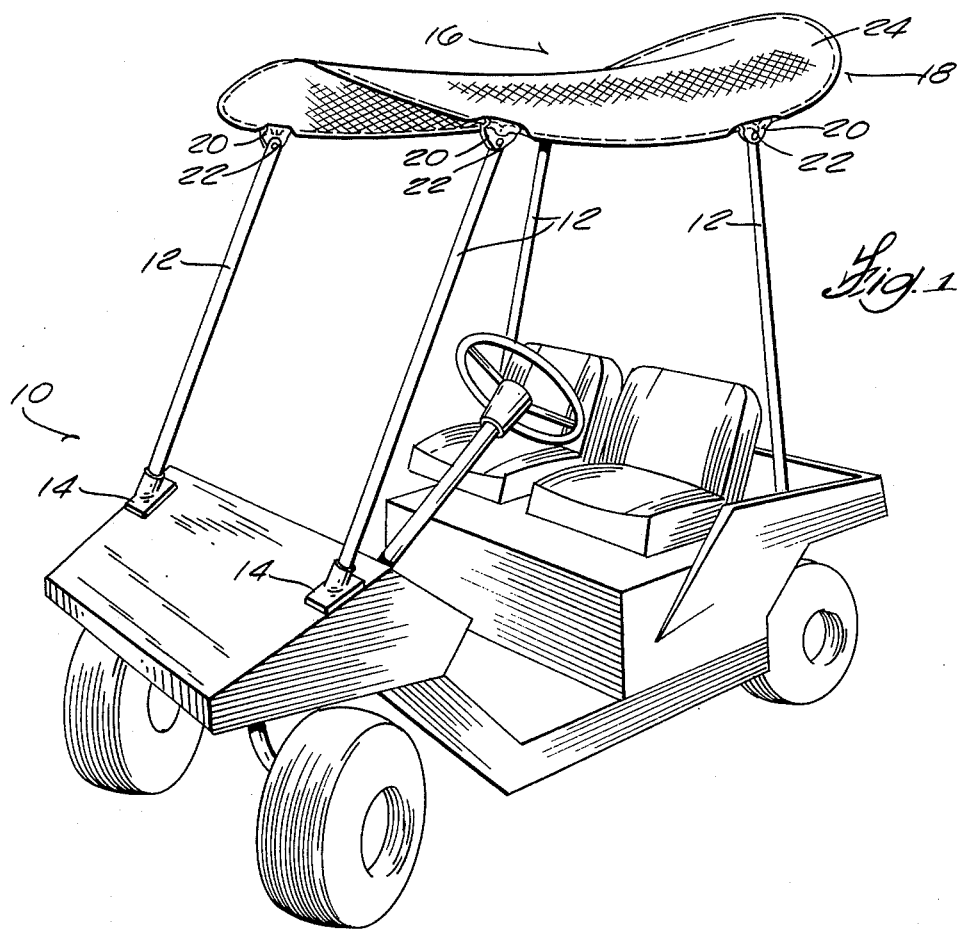
FIG. 1 is a perspective view of a canopy which embodies various of the features of the invention and which is shown mounted on a golf car.

Before explaining at least one embodiment of the invention in detail, it is to be understood that the invention is not limited in its application to the details of the construction and the arrangement of the components set forth in the following description or illustrated in the drawing. The invention is capable of other embodiments being practiced and carried out in various ways. Also, it is to be understood that the phraseology and terminology used herein is for the purpose of description and should not be regarded as limiting.

DESCRIPTION OF THE PREFERRED EMBODIMENTS

Illustrated in the drawing is a golf car 10 including a plurality of upstanding support posts 12, each of which is supported at its lower end by a mount 14 (two shown) which is suitably fastened on the golf car frame. Carried on the upper ends of the support posts 12 is a soft top canopy 16 including a support frame 18 carried by a plurality of mounting brackets 20, each of which is adapted for mounting to the upper end of a support post 12, such as by a bolt 22, and further including a top 24 which preferably is one piece, which is made from a flexible, water-repellent material, such as a treated canvas material, vinyl coated nylon, a vinyl coated polyester material and the like, and which is suitably attached to the support frame 18.

The support frame 18 is made from resilient material and arranged in a configuration whereby, after attachment of the top 24 thereto, it is distorted or flexed from its free form and causes the top 24 to assume a generally upwardly convex shape in cross section. In order to promote the drainage of water off only the sides of the canopy 16 and to provide a pleasing esthetic appearance, the support frame 18 and the top 24 preferably are arranged in a manner, to be described in more detail below, such that the top 24 assumes a saddle-like or generally hyperbolic paraboloid shape as shown in FIG. 1.

While various arrangements can be employed, in the specific construction illustrated, the support frame 18 includes perimeter frame members which are made from a tough, resilient wire, such as a 0.190 inch diameter music wire, and in the free form have a planar, generally elliptical or circular shape. More specifically, the perimeter frame members of the support frame 18 consists of four wire segments: opposed, arcuate or bowed segments 26 and 28 which form end sections of the support frame 18 and opposed slightly bowed segments 30 and 32 which form side sections of the support frame 18.

Music wire, the preferred material for the perimeter frame members of the support frame 18, generally cannot be welded because of its tendency to become brittle and vulnerable to breaking. To obviate this problem, a small right angle bend is formed at each end of the wire segments 26, 28, 30 and 32 and each of the support brackets 20 is provided with a recessed portion for receiving and clampingly holding the end portions of adjacent wire segments.

Figure 3:
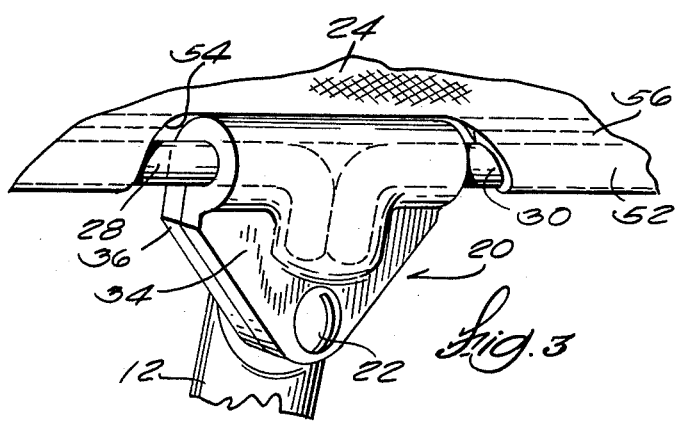
FIG. 3 is an enlarged view of the support brackets for the canopy of FIG. 1 after assembly of the support brackets with the perimeter frame members and installation of the flexible top on the perimeter frame.

In the specific construction illustrated in FIGS. 2 and 3, the recessed portions are formed in situ. That is, the support brackets 20 are U-shaped and have a pair of parallel-spaced walls 34 and 36 between which the end portions of adjacent wire segments, e.g., end segment 28 and side segment 30, are installed for assembly of the support frame 18. One of the walls, e.g., wall 34, thereafter is deformed over the end portions of the wire segments 28 and 30, such as with a conventional punch press, in a manner to clamp the wire segments in place as shown in FIG. 3 and thereby prevent them from rotating or twisting and from pulling out of the support brackets 20. For mounting the canopy 16 on the support posts 12, the walls 34 and 36 of each support bracket 20 are provided with coaxial apertures 37 through which the mounting bolt 22 is inserted.

After assembly of the wire segments 26, 28, 30 and 32 with the support brackets 20, the wire segments, in their free form, lie in a generally horizontal plane and generally form an elipse or a circle. In the specific construction illustrated in FIGS. 1—4, the assembled support 18 has a generally oval shape. The top 24 is cut in a pattern such that, when the outer edge thereof is folded over the wire segments 26, 28, 30 and 32 and suitably attached to the main body of the top 24 to form a hem for holding the wire segments, the wire segments are distorted or warped from their free form and, in attempting to return to their free form, induce multi-directional stresses on the top 24, causing it to assume a wrinkle-free, generally upwardly convex shape in cross section. More particularly, the end wire segments 26 and 28 are flexed or distorted upwardly from the plane of their free form. While the primary function of the side wire segments 26 and 28 is to maintain the central portion of the top 24 taut in a lateral direction, they also may be slightly distorted from their free form to perform this function.

The specific pattern selected for the top 24 depends upon the planar shape of the support frame 18 in its free form and the final shape desired for the top 24. Reference is made to FIG. 4 for an exemplary pattern of the top when the support frame 18 has a generally oval or elliptical shape, when the top 24 is to have a generally saddle-like or hyperbolic paraboloid final shape, and when a peripheral hem of substantially uniform width is used. The top 24, prior to formation of the hem, has a generally oblong shape with the difference between the longitudinal dimension of the top relative to the longitudinal dimension of the support frame 18 being somewhat less than the difference between the lateral dimension of the top relative to the lateral dimension of the support frame 18. When the outer edge of the top 24 is folded over the wire segments 26, 28, 30 and 32 at a substantially uniform width to form a continuous peripheral hem 52 as shown in FIG. 3 (except for notches 54 provided to accommodate the support brackets 20), the end segments 26 and 28 are distorted or flexed upwardly from the plane of their free form and the top 24 assumes a generally saddle-like or hyperbolic paraboloid shape. The hem 52 is fastened to the main body of the top 24 by stitching 56 (FIG. 3) or by releasable snap fasteners, an adhesive, or any other suitable fastening means.

The final vertical height of the top 24 is governed by the longitudinal dimension of the top 24 relative to the longitudinal dimension of the support frame 18. That is, as the longitudinal dimension of the top 24 is decreased relative to the longitudinal dimension of the support frame 18, the degree of upward deflection of the end segments 26 and 28, and thus the final vertical height of the top 24, is increased. The final vertical height of the central portion of the top 24 is governed by the lateral dimension of the top 24 relative to the lateral dimension of the support frame 18. That is, as the lateral dimension of the top is increased relative to the lateral dimension of the support frame 18, the central portion of the top 24, in its final shape, becomes less bowed in the longitudinal direction.

It is within the scope of the invention for the top 24 to have a final shape which is generally semicylindrical when viewed from the end. In other words, instead of the central portion of the top 24 being bowed longitudinally, the top most edge can be substantially straight. This can be accomplished by properly dimensioning the lateral dimension of the top 24 relative to the lateral dimension of the support frame 18. In any case, the top 24, in its final shape, will be generally upwardly convex in cross section. With this shape, the top 24 is capable of readily shedding rain water without the use of any additional support means, such as cross members and/or stays commonly used in prior art constructions of soft top canopies to provide a crowned shape.

When the support frame 18 and the support brackets 20 are of the construction illustrated in FIG. 2-3, it is usually more convenient to attach the top 24 onto the support frame 18 after the wire segments 26, 28, 30 and 32 and the support brackets 20 have been assembled. For instance, the end segments 26 and 28 can be manually flexed upwardly so that the outer edge of the top 24 can be folded over the wire segments to form the peripheral hem 52.

Figure 5:
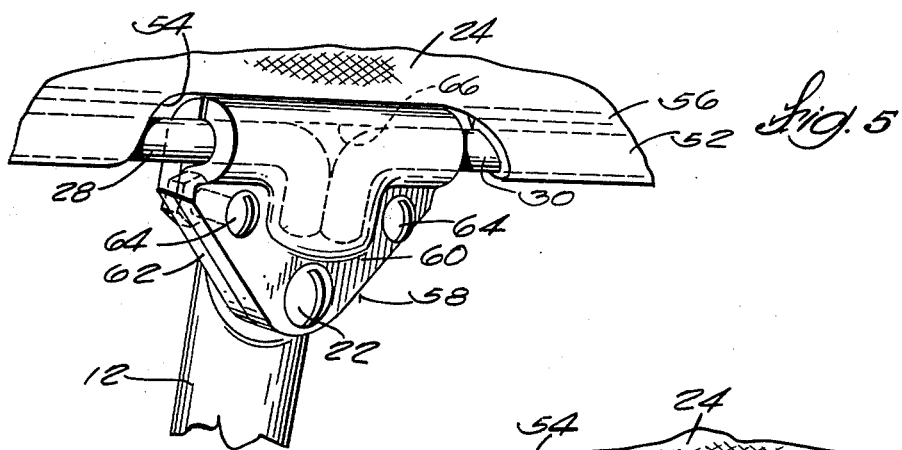
FIG. 5 is an enlarged view of an alternate construction of the support brackets, shown after assembly with the perimeter frame members and installation of the flexible top on the perimeter frame.

Illustrated in FIG. 5 is an alternate construction for the support brackets. Each support bracket 58 includes separate parts 60 and 62 which are fastened together, such as by a pair of bolts 64, to clamp the end portions of adjacent wire segments, e.g., end segment 28 and side segment 30, in place. One or both of the parts 60 and 62 (part 60 in FIG. 4) is provided with a generally T-shaped recess 66 for receiving the ends of the adjacent wire segments. With this construction, the peripheral hem 52 can be preformed in the top 24 and the wire segments 26, 28, 30 and 32 installed therein before assembly with the support brackets 58.

An alternate construction for the canopy is illustrated in FIG. 6. Instead of being formed from four separate segments, the support frame 70 is formed from a single piece of resilient material, such as a single piece of tough, resilient wire suitably joined at the opposite ends, and has a generally circular planar shape in its free form. In this alternate construction, the support brackets either are initially slidably mounted on the support frame 70 or are mounted on the support frame 70 after the top 72 has been attached and include suitable means for clamping in place on the support frame 70 after attachment of the top 72. The top 72 has an oblong shape with the lateral dimension thereof approximating the diameter of the support frame 70 in its free form and the longitudinal dimension being somewhat larger than the diameter of the support frame 70.

When the outer edge of the top 72 is folded over the support frame 70 at a substantially uniform width to form a continuous peripheral hem as described above (except for notches 74 provided to accommodate the support brackets), the support frame 70 is distorted into a generally oval or elliptical shape and the opposite end portions 76 and 78 are deflected upwardly from the plane of their free form causing the top 72 to assume a generally saddle-like or hyperbolic paraboloid shape like that shown in FIG. 1.

It is within the scope of the invention to use more or fewer than four support brackets. For instance, a pair of generally opposed support brackets can be used. Also, the support frame can be formed from a variety of resilient material having a sufficient structural integrity to hold the top in the desired shape, such as high-strength, resilient plastic materials. Furthermore, the top can be patterned so that an outer portion hangs down like a curtain in which case a hem is formed therein to provide the deflection of the support frame required to produce the desired final shape of the top.

From the above description, it can be appreciated that the soft top vehicle canopy provided by the invention is very lightweight, permitting the use of less expensive materials for the support posts and the vehicle mounts therefor, and requires a minimum of fabrication or assembly operations, thereby reducing the overall cost of production. Also, the resilient characteristic of the support frame 18 permits substantial deflection of the frame and/or the top 24 upon striking tree branches, shrubs or other objects, thereby minimizing the likelihood of damage to the canopy Various features of the invention are set forth in the following claims.

What is claimed is:

1. A canopy for a vehicle, which canopy is adapted for mounting on a plurality of upstanding support posts carried by the vehicle, said canopy comprising bracket means adapted for mounting said canopy on the support posts, a resilient perimeter frame supported by said bracket means and including opposed arcuate end sections which, in their free form, extend generally horizontally in outwardly bowed relation to each other, a flexible, water-repellent top, and means mounting said top on said perimeter frame so as to distort said end sections upwardly from their free form and cause said end sections, in attempting to return to their free form, to apply multi-directional tensions on said top such that said top assumes a generally upwardly convex shape in cross section.

2. A canopy according to claim 1 wherein said perimeter frame and said top are arranged such that said top assumes a saddle-like shape.

3. A canopy according to claim 2 wherein said end sections are formed from a wire.

4. A canopy according to claim 3 wherein said wire is a music wire.

5. A canopy according to claim 1 wherein said top includes a peripheral hem receiving said end sections.

6. A canopy for a vehicle, which canopy is adapted for mounting on a plurality of upstanding support posts carried by the vehicle, said canopy comprising a pair of brackets adapted for mounting said canopy on the support posts, each of said brackets including a pair of recesses, a resilient perimeter frame supported by said brackets and including opposed arcuate end sections which are formed from separate segments of wire, which have opposite ends terminating in right angle bends including end portions respectively fixedly received in said recesses, and which, in their free form, extend generally horizontally in outwardly bowed relation to each other, a flexible, water-repellent top, and means mounting said top on said perimeter frame so as to distort said end sections upwardly from their free form and cause said end sections, in attempting to return to their free form, to apply multi-directional tensions on said top such that said top assumes a generally upwardly convex shape in cross section.

7. A canopy according to claim 6 wherein said perimeter frame further includes a pair of segments of said wire forming opposed side sections, each of which is interposed the ends of said end segments and terminates in a right angle bend including an end portion, and said canopy further includes four of said brackets, each of said brackets including a recess for receiving and clampingly holding said end portion of one of said end segments and said end portion of one of said side segments.

8. A canopy according to claim 7 wherein each of said brackets includes a U-shaped member having generally parallel spaced walls between which said end portion of one of said end segments and said end portion of one of said side segments are installed, one of said walls being deformed about said end portions after installation thereof so as to clamp said segments in place.

9. A canopy according to claim 7 wherein each of said brackets includes separate parts, at least one of which includes a recessed portion for receiving said end portion of one of said end segments and said end portion of one of said side segments when said parts are fastened together, and means for fastening said parts together so as to clamp said segments in place.

* * * * *